(12) United States Patent
Doherty et al.

(10) Patent No.: US 11,344,841 B2
(45) Date of Patent: May 31, 2022

(54) AIR SEPARATION MODULES AND METHODS OF MAKING AIR SEPARATION MODULES

(71) Applicant: Hamilton Sundstrand Corporation, Charlotte, NC (US)

(72) Inventors: James R. Doherty, Feeding Hills, MA (US); Donald E. Army, Enfield, CT (US)

(73) Assignee: HAMILTON SUNDSTRAND CORPORATION, Charlotte, NC (US)

( * ) Notice: Subject to any disclaimer, the term of this patent is extended or adjusted under 35 U.S.C. 154(b) by 149 days.

(21) Appl. No.: 16/813,034

(22) Filed: Mar. 9, 2020

(65) Prior Publication Data

US 2021/0275962 A1    Sep. 9, 2021

(51) Int. Cl.
*B01D 53/22* (2006.01)
*B01D 63/04* (2006.01)

(52) U.S. Cl.
CPC ......... *B01D 53/228* (2013.01); *B01D 63/043* (2013.01); *B01D 2053/223* (2013.01); *B01D 2313/44* (2013.01)

(58) Field of Classification Search
CPC .......... B01D 2313/44; B01D 2053/223; B01D 53/228; B01D 63/043
See application file for complete search history.

(56) References Cited

U.S. PATENT DOCUMENTS

| | | | |
|---|---|---|---|
| 2,640,332 A * | 6/1953 | Keyes | F25J 3/04 62/654 |
| 3,182,435 A * | 5/1965 | Axt | C01B 33/46 96/114 |
| 5,026,479 A | 6/1991 | Bikson et al. | |
| 5,352,361 A | 10/1994 | Prasad et al. | |
| 6,203,707 B1 * | 3/2001 | Hartmann | B01D 63/02 210/650 |

(Continued)

FOREIGN PATENT DOCUMENTS

FR    3011483 A1    4/2015

OTHER PUBLICATIONS

Abstract for FR3011483A1, 1 page.
Extended European Search Report for International Application No. 21161590.1 dated Aug. 2, 2021, 11 pages.

*Primary Examiner* — Anthony R Shumate
(74) *Attorney, Agent, or Firm* — Cantor Colburn LLP

(57) ABSTRACT

An air separation module includes a canister, a separator, and a perforated plate. The canister has a plenum portion connecting an inlet portion to an outlet portion, extends circumferentially about a canister axis, and has a plenum diameter that is larger than a canister diameter defined by the inlet and outlet portion of the canister. The separator is arranged within the canister and axially spans the plenum portion to separate air received at the inlet end portion into nitrogen-enriched and oxygen-enriched air flows. The perforated plate is seated within the plenum portion, fluidly couples the separator to an oxygen-enriched air outlet port defined by the plenum portion, and has a snap-fit major dimension smaller than the plenum diameter to radially support a portion of the separator axially spanning the plenum portion of the canister. Nitrogen generation systems and methods of making air separation modules are also described.

20 Claims, 9 Drawing Sheets

(56) References Cited

U.S. PATENT DOCUMENTS

| | | | |
|---|---|---|---|
| 9,186,628 B2 | 11/2015 | Fautsch et al. | |
| 9,199,191 B2 | 12/2015 | Fukuda et al. | |
| 9,302,778 B2 | 4/2016 | Ji | |
| 9,855,544 B2 | 1/2018 | Peacos, III et al. | |
| 11,134,585 B2 * | 9/2021 | LeGros | H05K 7/20854 |
| 2003/0098149 A1 * | 5/2003 | Wellington | E21B 43/24 |
| | | | 166/52 |
| 2004/0069701 A1 | 4/2004 | Vasse et al. | |
| 2004/0146602 A1 * | 7/2004 | Garwood | B65D 21/062 |
| | | | 426/35 |
| 2004/0188339 A1 * | 9/2004 | Murkute | B01D 61/20 |
| | | | 210/321.8 |
| 2005/0247197 A1 * | 11/2005 | Snow, Jr. | A62C 3/06 |
| | | | 95/138 |
| 2006/0172417 A1 * | 8/2006 | Rathenow | B01D 69/00 |
| | | | 435/383 |
| 2014/0309045 A1 * | 10/2014 | Hirukawa | F16D 3/223 |
| | | | 464/145 |
| 2014/0360891 A1 * | 12/2014 | Kline | F17C 11/00 |
| | | | 206/0.7 |
| 2017/0080380 A1 * | 3/2017 | Bocciardo | B01D 53/226 |
| 2017/0080381 A1 * | 3/2017 | Bocciardo | B01D 71/64 |
| 2018/0221824 A1 | 8/2018 | Visser et al. | |
| 2021/0291991 A1 * | 9/2021 | Army | B64D 13/08 |

* cited by examiner

AIR SEPARATION MODULES AND METHODS OF MAKING AIR SEPARATION MODULES

BACKGROUND

The present disclosure is generally related to nitrogen generation systems, and more particularly to air separation modules for nitrogen generation systems on vehicles.

Vehicles, such as aircraft, commonly carry liquid fuel in fuel tanks. The fuel tanks generally define an interior ullage space between the liquid fuel and the interior of the fuel tank. The ullage space is typically occupied by a mixture of fuel vapor and ambient air. Since such fuel vapor-air mixtures can be hazardous when oxygen concentration in the ullage space is sufficient to support combustion, some vehicles employ inerting systems. Such inerting systems generally provide a flow of nitrogen-enriched air to the vehicle fuel tanks, typically using an air separation module, to limit concentration of oxygen within the fuel tank.

Air separation modules generate nitrogen-enriched air by forcing pressurized air through a separator structure. As pressurized air traverses the separator structure the separator structure separates the pressurized air into a nitrogen-enriched fraction and an oxygen enriched fraction. The nitrogen-enriched fraction is routed to the vehicle fuel tank via the inerting system, and the oxygen-enriched fraction diverted away from the fuel tank, typically through a nitrogen-enriched fraction port and an oxygen-enriched fraction port defined at different locations by a canister supporting the separator structure. The oxygen-enriched port typically requires defining perforations in the canister such that the canister structure can both allows the oxygen-enriched fraction to exit the canister and provide support to the separator structure. Perforating the canister adds cost and complexity to the canister.

Such systems and methods have generally been acceptable for their intended purpose. However, there remains a need for improved air separation modules, nitrogen generation systems, and methods of making air separation modules.

BRIEF DESCRIPTION

An air separation module is provided. The air separation module includes a canister with a plenum portion connecting an inlet portion to an outlet portion, the canister extending circumferentially about a canister axis, and the plenum portion having a plenum diameter that is larger than a canister diameter defined by both the inlet portion and the outlet portion of the canister. A separator is arranged within the canister, axially spans the plenum portion of the canister, and is configured to separate air received at the inlet end portion into a nitrogen-enriched air flow and an oxygen-enriched air flow. A perforated plate is seated within the plenum portion of the canister, fluidly couples the separator to an oxygen-enriched air outlet port defined by the plenum portion, and has a snap-fit major dimension that is smaller than the plenum diameter to radially support a portion of the separator axially spanning the plenum portion of the canister.

In addition to one or more of the features described above, or as an alternative, further examples of the air separation module include that the perforated plate has a perforated portion with a plurality of perforations extending therethrough.

In addition to one or more of the features described above, or as an alternative, further examples of the air separation module include that the perforated plate has a flange portion extending radially outward from the perforated portion of the perforated plate.

In addition to one or more of the features described above, or as an alternative, further examples of the air separation module include that the flange portion is a first flange portion and the perforated plate has a second flange portion, wherein the perforated portion connects the first flange portion to the second flange portion.

In addition to one or more of the features described above, or as an alternative, further examples of the air separation module include that the perforated portion of the perforated plate is radially spaced from an interior surface of the plenum portion by the flange portion of the perforated plate, and that the interior surface and the perforated portion defining a plenum therebetween.

In addition to one or more of the features described above, or as an alternative, further examples of the air separation module include that the perforated plate extends circumferentially about the separator and abuts a radially outer surface of the separator.

In addition to one or more of the features described above, or as an alternative, further examples of the air separation module include that the perforated plate has a split annulus body with a plate end and a clip end, and that the plate end slidably disposed within the clip end of the split annulus body.

In addition to one or more of the features described above, or as an alternative, further examples of the air separation module include that the plate end of the split annulus body has a plate member extending circumferentially therefrom.

In addition to one or more of the features described above, or as an alternative, further examples of the air separation module include that the clip end of the split annulus body has a radially inner clip member and a radially outer clip member extending circumferentially from the clip end of the split annulus body.

In addition to one or more of the features described above, or as an alternative, further examples of the air separation module include that the perforated plate include a first annular segment with a plate end and a second annular segment with a clip end, and that the plate end of the first annular segment is slidably received within the clip end of the second annular segment.

In addition to one or more of the features described above, or as an alternative, further examples of the air separation module include that the first annular segment has a clip end, that the second annular segment has a plate end, and that the plate end of the second annular segment is slidably received within the clip end of the first annular segment.

In addition to one or more of the features described above, or as an alternative, further examples of the air separation module include that the first annular segment and the second annular segment cooperate to circumferentially span the plenum portion of the canister.

In addition to one or more of the features described above, or as an alternative, further examples of the air separation module include that the inlet portion of the canister is arranged radially inward of the plenum portion of the canister, and that the outlet portion of the canister is arranged radially inward of the plenum portion of the canister.

In addition to one or more of the features described above, or as an alternative, further examples of the air separation module include an inlet end cap fixed to the inlet portion of the canister and an outlet end cap fixed to the outlet portion of the canister, wherein the separator is enclosed within the inlet end cap, the outlet end cap, and the canister.

In addition to one or more of the features described above, or as an alternative, further examples of the air separation module include that the snap-fit major dimension of the perforated plate is substantially equivalent to the canister diameter.

In addition to one or more of the features described above, or as an alternative, further examples of the air separation module include that the perforated plate and the plenum portion define a plenum therebetween, that the plenum extends circumferentially about the perforated plate and fluidly couples the separator with the oxygen-enriched air outlet port, that the perforated plate has a compressed major dimension and a relaxed major dimension, that the relaxed major dimension larger than the snap-fit major dimension, and that the compressed major dimension smaller than the snap-fit major dimension.

A nitrogen generation system is also provided. The nitrogen generation system includes an air separation module as described above. The perforated plate has a perforated portion with two or more perforations extending therethrough, an ozone converter is fluidly coupled to the air separation module, an oxygen sensor fluidly coupled to the ozone converter by the air separation module, and a flow control valve fluidly coupled to the ozone converter by the air separation module.

In addition to one or more of the features described above, or as an alternative, further examples of the nitrogen generation system include that the perforated plate extends circumferentially about the separator, that the perforated plate abuts a radially outer surface of the separator, and that the nitrogen generation system further includes a compressed air source fluidly coupled to the air separation module and a fuel tank fluidly coupled to the compressed air source by the air separation module.

In addition to one or more of the features described above, or as an alternative, further examples of the nitrogen generation system include that the perforated plate has a split annulus body with a plate end and a clip end, that the plate end is slidably disposed within the clip end of the split annulus body, that the plate end is adjacent the clip end when the perforated plate is compressed, and that the plate end is spaced apart from the clip end when the perforated plate is relaxed.

A method of making an air separation module includes, at an air separation module as described above, compressing a perforated plate such that the perforated plate has a compressed major dimension smaller than the canister diameter; seating the perforated plate within the plenum portion of the canister by relaxing the compressed perforated plate, the perforated plate having a snap-fit major dimension that is smaller than the plenum diameter once relaxed; and arranging a separator configured to separate air received at the inlet end portion into a nitrogen-enriched air flow and an oxygen-enriched air flow within the canister, the separator spanning the plenum portion and supported radially inward of the plenum portion by the perforated plate.

Technical effects of the present disclosure include air separation modules that are relatively simple to fabricate. Technical effects of the present disclosure also include air separation modules that are relatively inexpensive. Technical effects of the present disclosure further include air separation modules having canisters without perforated portions for communicating oxygen-enriched air separated from air provided to the air separation module.

BRIEF DESCRIPTION OF THE DRAWINGS

The following descriptions should not be considered limiting in any way. With reference to the accompanying drawings, like elements are numbered alike.

DETAILED DESCRIPTION

Figure 1:
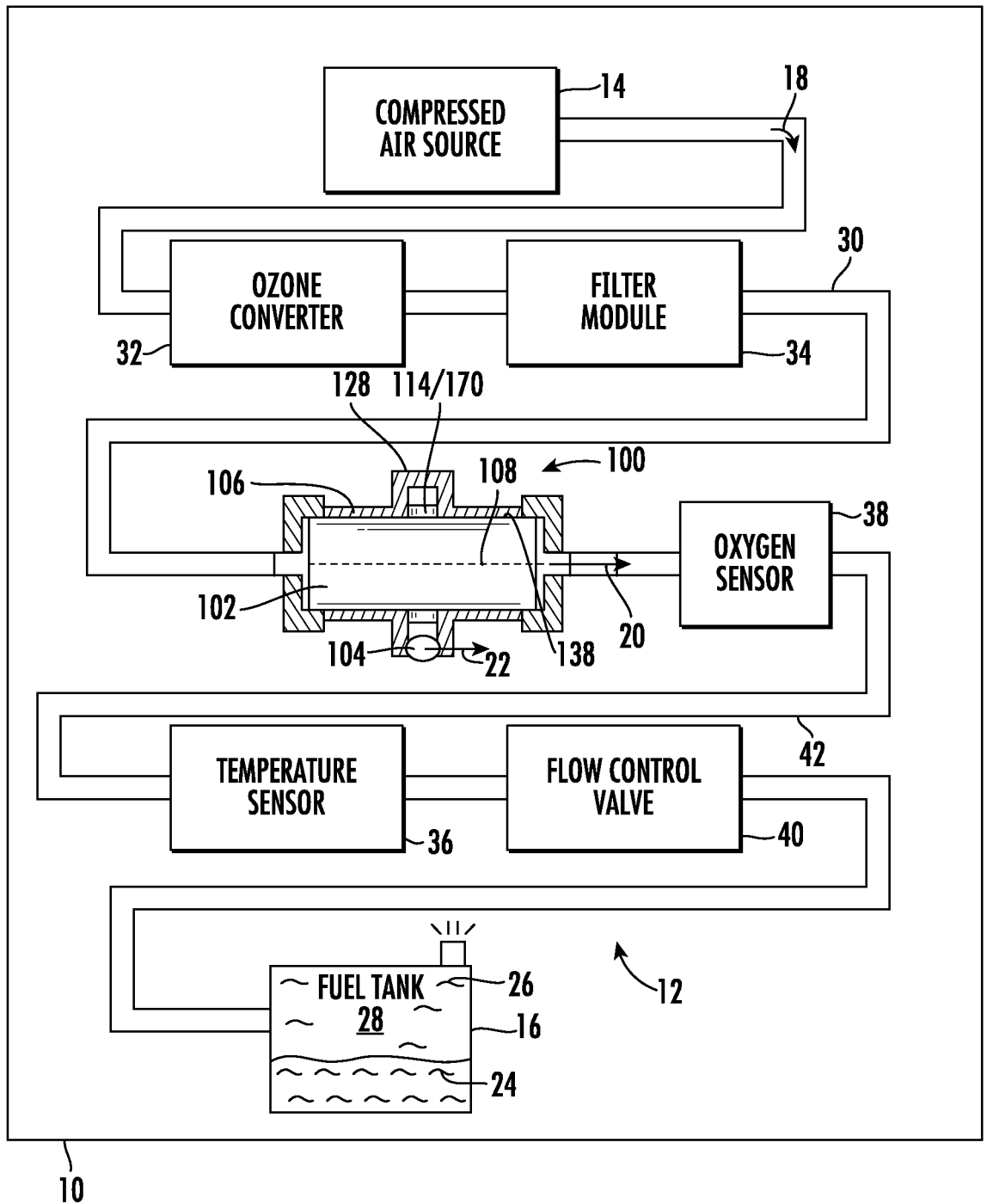
FIG. 1 is a schematic view of an air separation module constructed in accordance with the present disclosure, showing the air separation module providing a nitrogen-enriched air flow to a fuel tank in a nitrogen generation system.

Reference will now be made to the drawings wherein like reference numerals identify similar structural features or aspects of the subject disclosure. For purposes of explanation and illustration, and not limitation, a partial view of an example of an air separation module constructed in accordance with the present disclosure is shown in FIG. 1 and is designated generally by reference character 100. Other embodiments of air separation modules, nitrogen generation systems, and methods of making air separation modules in accordance with the present disclosure are provided in FIGS. 2-9, as will be described. The air separation modules and nitrogen generation systems described herein can be used for generating nitrogen-enriched air flows, such as for on-board inert gas generation systems (OBIGGS) for fuel tanks on aircraft, though the present disclosure is not limited inerting fuel tanks or to generating nitrogen-enriched air flows on aircraft in general.

Referring to FIG. 1, a vehicle 10, e.g., an aircraft, is shown. The vehicle 10 includes a nitrogen generation system 12 including the air separation module 100, a compressed air source 14, and a fuel tank 16. The compressed air source 14 is fluidly coupled to the nitrogen generation system 12, is arranged to generate a compressed air flow 18, and is in fluid communication therethrough with the fuel tank 16. The nitrogen generation system 12 is arranged to generate a nitrogen-enriched air flow 20 and an oxygen-enriched air flow 22 from the compressed air flow 18 and is further arranged to communicate the nitrogen-enriched air flow 20 to the fuel tank 16. The fuel tank 16 contains liquid fuel 24 and fuel vapors 26 in an ullage space 28 defined between the liquid fuel 24 and the interior of the fuel tank 16. In certain examples the compressed air source 14 is a compressor section of a gas turbine engine, such as a main engine or an auxiliary power unit for an aircraft.

The nitrogen generation system 12 includes inlet conduit 30, an ozone converter 32, a filter module 34, and a temperature sensor 36. The nitrogen generation system also includes an oxygen sensor 38, a flow control valve 40, and an outlet conduit 42.

The inlet conduit 30 fluidly couples the compressed air source 14 to the air separation module 100 to communicate the compressed air flow 18 to the air separation module 100. The filter module 34 is arranged along the inlet conduit 30 to separate debris and/or moisture entrained in the compressed air flow 18 at a location fluidly upstream of the air separation module 100. As will be appreciated by those of skill in the art of view of the present disclosure, removing entrained debris improves the reliability of the air separation module 100 by limiting (or eliminating entirely) entrained debris and/or moisture from reaching the air separation module 100.

The air separation module 100 has a separator 102 and an oxygen-enriched air (OEA) outlet port 104. The separator 102 is arranged to separate nitrogen molecules from oxygen molecules according to molecule size to generate the nitrogen-enriched air flow 20 and the oxygen-enriched air flow 22. It is contemplated that the separator 102 communicate the nitrogen-enriched air flow 20 to the outlet conduit 42, and therethrough to the fuel tank 16, and further communicate the oxygen-enriched air flow 22 to the OEA outlet port 104. In certain examples the separator 102 includes a hollow fiber mat roll contained within a canister 106 of the air separation module 100. Examples of suitable hollow fiber mats include PEEK-Sep™ hollow fiber mats available from Air Liquide Advanced Separations of Woburn, Mass.

The oxygen sensor 38 and the flow control valve 40 are arranged along the outlet conduit 42, are arranged to measure concentration of oxygen in the nitrogen-enriched air flow 20 and control flow of the nitrogen-enriched air flow 20 to the fuel tank 16. The outlet conduit 42 fluidly couples the air separation module 100 to the fuel tank 16 to communicate the nitrogen-enriched air flow 20 to the fuel tank, the nitrogen-enriched air flow 20 limiting concentration of oxygen within the ullage space 28 to below that required for combustion of the fuel vapors 26. The oxygen sensor 38 is fluidly coupled to the ozone converter 32 by the separator 102. The flow control valve 40 is fluidly coupled to the ozone converter by the separator 102. In certain examples the flow control valve 40 is fluidly coupled to the separator 102 by the oxygen sensor 38.

Figure 2:
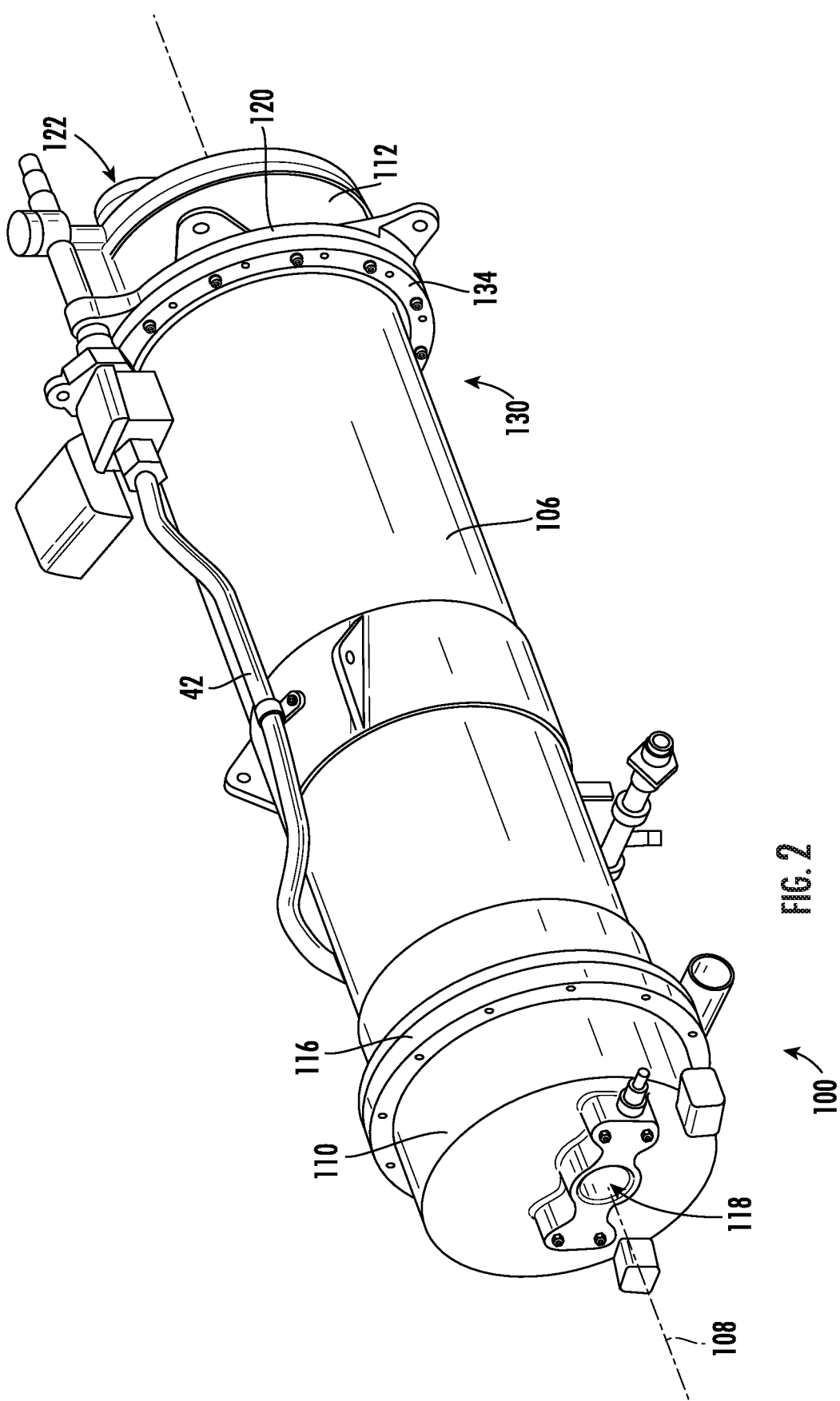
FIG. 2 is a perspective view of the air separation module of FIG. 1 according to an example, showing a canister containing a separator and coupling an inlet end cap to an outlet end cap.

With reference to FIG. 2, the air separation module 100 is shown according to an example. The air separation module 100 defines a canister axis 108 and includes the separator 102 (shown in FIG. 1), the canister 106, and an inlet end cap 110. The air separation module 100 also includes an outlet end cap 112 and a perforated plate 114 (shown in FIG. 3).

The inlet end cap 110 has an inlet end cap flange 116 and defines an inlet port 118. The inlet end cap flange 116 extends about the canister axis 108, fixes the inlet end cap 110 to the canister 106, and radially overlaps the separator 102 and inlet end portion 126 (shown in FIG. 3) of the canister 106. The inlet port 118 extends through the inlet end cap 110 and fluidly couples the separator 102 (shown in FIG. 1) to the inlet conduit 30 (shown in FIG. 1). The outlet end cap 112 is similar to the inlet end cap 110 and additionally has an outlet end cap flange 120 and an outlet port 122. The outlet end cap flange 120 extends about the canister axis 108 and fixes the outlet end cap 112 to the canister 106. The outlet port 122 fluidly couples the separator 102 to the outlet conduit 42, and therethrough to the fuel tank 16 (shown in FIG. 1). Fixation of the inlet end cap 110 and the outlet end cap 112 to the canister 106 can be, for example, by fasteners received in the inlet end cap flange 116 and the outlet end cap flange 120.

Figure 3:
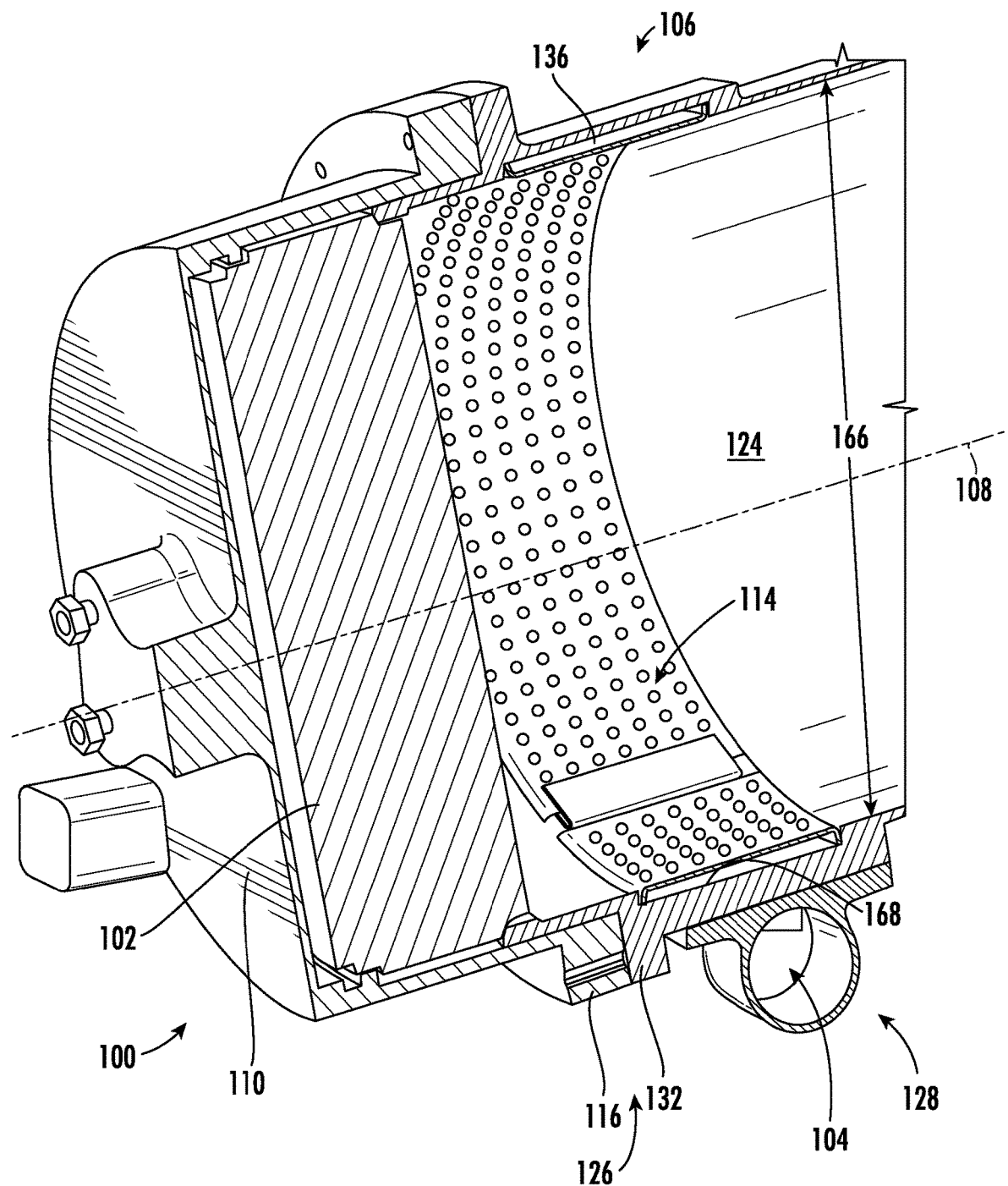
FIG. 3 is cross-sectional view of a portion of the air separation module of FIG. 1 according to the example, showing a perforated plate seated in a plenum portion of the canister to fluidly couple the separator to an oxygen-enriched air outlet port and provide radial support to the separator.

With reference to FIG. 3, the canister 106 has the inlet end portion 126, an interior 124, a plenum portion 128, and an outlet end portion 130 (shown in FIG. 2). The inlet end portion 126 is connected to the outlet end portion 130 by the plenum portion 128 and has an inlet end flange 132. The inlet end flange 132 extends circumferentially about the canister axis 108 and seats thereon the inlet end cap flange 116 to fix the inlet end cap 110 to the inlet end portion 126 of the canister 106. The outlet end portion 130 of the canister 106 has an outlet end flange 134 (shown in FIG. 2) extending about the canister axis 108, which seats thereon the outlet end cap flange 120 (shown in FIG. 2) to fix the outlet end cap 112 to the outlet end portion 130 of the canister 106.

The plenum portion 128 extends circumferentially about the canister axis 108, is arranged radially outward of the inlet end portion 126 and the outlet end portion 130 of the canister 106 and defines therein a plenum 136. The plenum 136 extends circumferentially about the canister axis 108 and separator 102 (only a portion of which is shown in FIG. 3), fluidly couples the separator 102 to the OEA outlet port 104 and contains therein the perforated plate 114. As shown in FIG. 1, the perforated plate 114 is arranged radially between the separator 102 and the plenum portion 128 of the canister 106, extends circumferentially about the separator 102 and the canister axis 108, and abuts a radially outer surface 138 of the separator 102.

Figure 4:
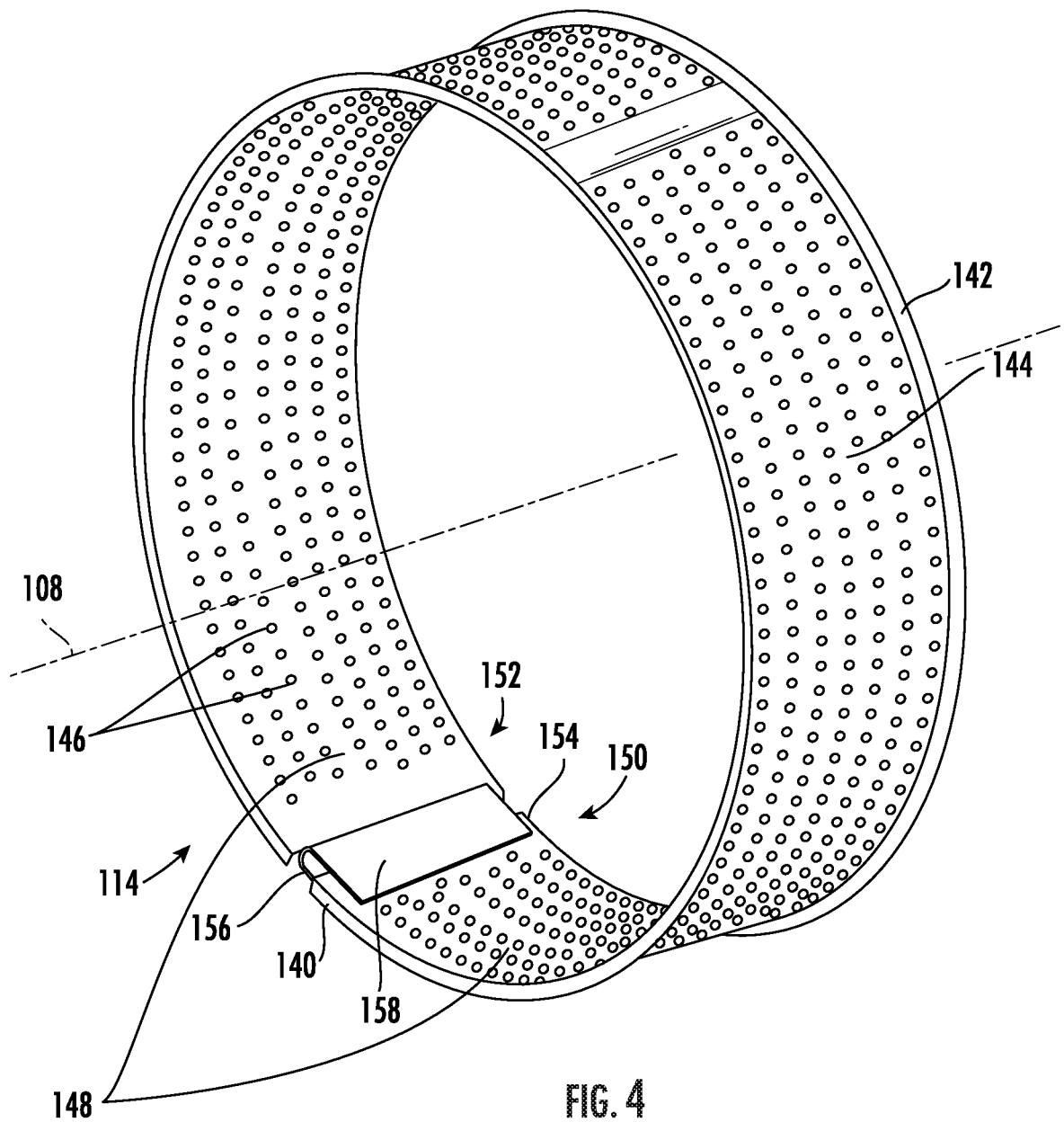
FIG. 4 is a perspective view of the perforated plate of the air separation module of FIG. 1 according to a first example of the perforated plate, showing a split annulus body having a plate end and clip end coupled to one another.

With reference to FIG. 4, the perforated plate 114 is shown according to a first example. The perforated plate 114 has a first flange portion 140, a second flange portion 142, and a perforated portion 144. The first flange portion 140 extends circumferentially about the canister axis 108, is arranged axially between the inlet end cap 110 (shown in FIG. 2) and the OEA outlet port 104 (shown in FIG. 1) of the canister 106 (shown in FIG. 1), and extends radially outward from the perforated portion 144. The second flange portion 142 extends circumferentially about the canister axis 108, is arranged axially between the OEA outlet port 104 and the outlet end portion 130 (shown in FIG. 2) of the canister 106 and extends radially outward from the perforated portion 144. It is contemplated that first flange portion 140 and the second flange portion 142 radially space the perforated plate 114, e.g., the perforated portion 144, from the plenum portion 128 of the canister 106.

Figure 5:
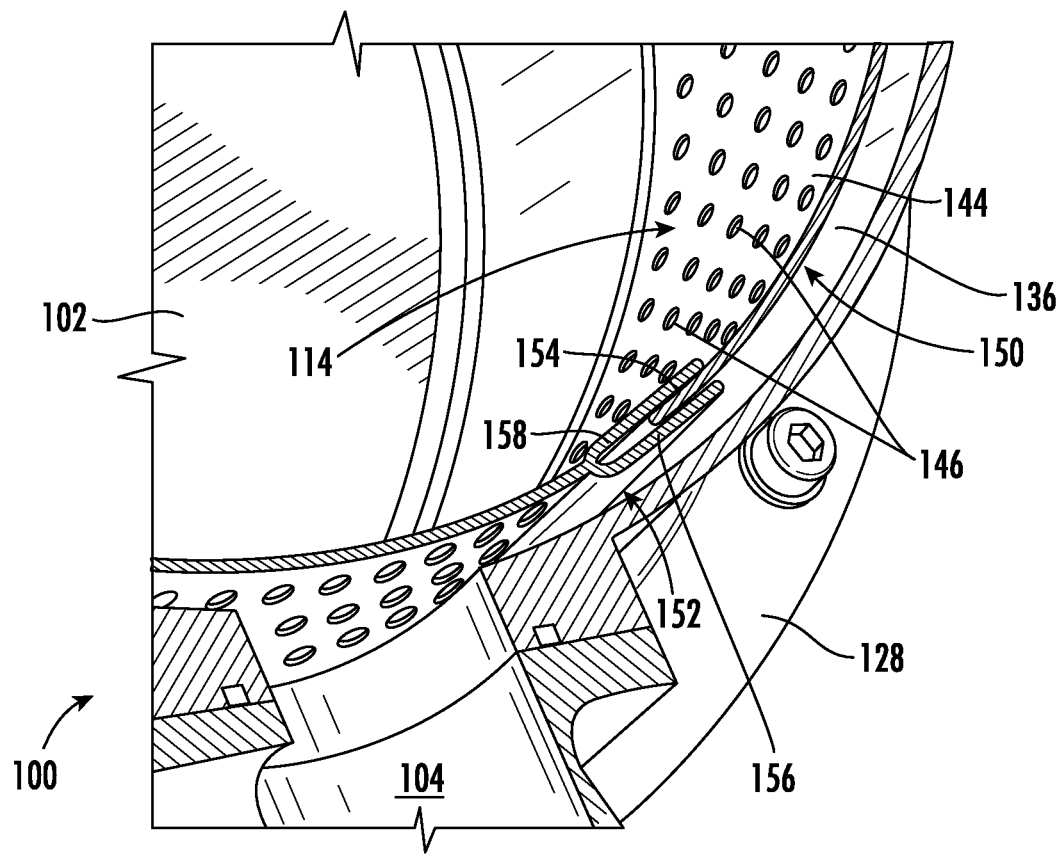
FIG. 5 is a cross-sectional view of a portion of air separation module of FIG. 1 including a portion of the perforated plate according to the first example, showing perforated plate snap-fit into the interior of the canister and fluidly coupling an interior of the canister to the oxygen-enriched air output port.

With reference to FIGS. 3-5, the perforated portion 144 of the perforated plate 114 couples the first flange portion 140 to the second flange portion 142 and has a plurality of perforations 146 extending radially therethrough. The plurality of perforations 146 are distributed circumferentially about the perforated portion 144 of the split annulus body 148 and fluidly couple the separator 102 to the plenum 136, and therethrough to the OEA outlet port 104. This allows oxygen molecules separated from the compressed air flow 18 (shown in FIG. 1) to collect within the plenum 136 and be swept therefrom through the outlet port 104 to form the oxygen-enriched air flow 22 (shown in FIG. 1).

As shown in FIGS. 4 and 5, in the illustrated example the perforated plate 114 has a split annulus body 148 with a plate end 150 and a clip end 152. A plate member 154 extends from the plate end 150 of the split annulus body 148 circumferentially about the axis 108. A radially outer clip member 156 and a radially inner clip member 158 extends circumferentially from the clip end 152 of the split annulus body 148, are arcuate in shape, and are arranged to slidably receive between one another the plate member 154.

Figure 6:
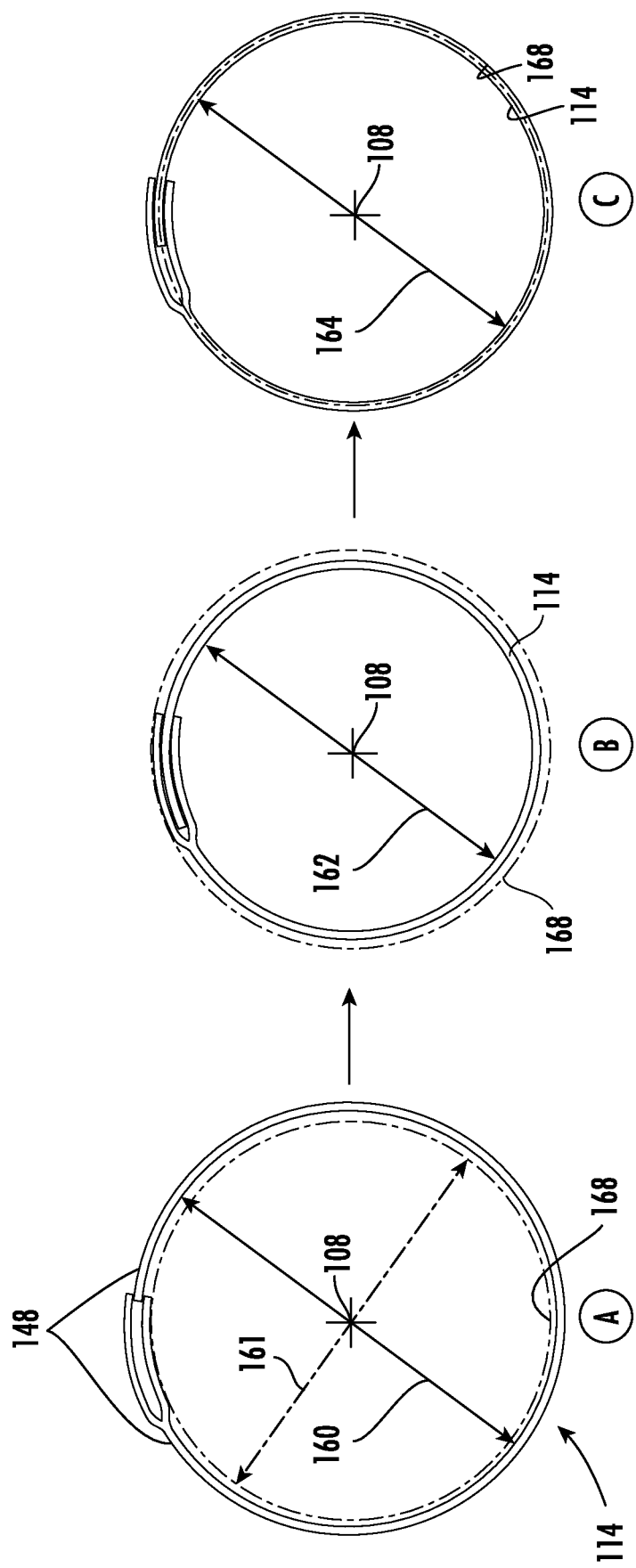
FIG. 6 is a schematic view of the perforated plate in relation to an inner diameter of the canister of the air separation module of FIG. 1 according to the first example, sequentially showing change in the perforated plate major dimension as the perforated plate is compressed from its relaxed diameter, positioned within the canister, and partially relaxed to snap-fit within the plenum portion of the canister.

With reference to FIG. 6, it is contemplated that the split annulus body 148 of the perforated plate 114 be resilient in construction, e.g., formed from spring steel, to facilitate assembly and fixation of the perforated plate 114 within the canister 106. In this respect the inner diameter of the split annulus body 148 has a relaxed major dimension 160 (shown at reference letter A), a compressed major dimension 162 (shown at reference letter B), and a snap-fit major dimension 164 (shown at reference letter C). The relaxed major dimension 160 is larger than a plenum diameter 161 defined by the plenum portion 128 (shown in FIG. 1) of the canister 106. The compressed major dimension 162 is smaller than a canister diameter 166 (shown in FIG. 3) defined by an interior surface of the canister 106. The relaxed major dimension 160 is greater than the canister diameter 166 of the canister 106. In certain examples the snap-fit major dimension 164 is substantially equivalent to an inner diameter of the canister 106, e.g., such that a radially inner surface of the canister 106 and a radially inner surface of the perforated plate 114 define a common diameter about the separator 102 (shown in FIG. 2), the separator 102 thereby uniformly supported along its axial length within the canister 106.

As shown sequentially at reference letters A through C in FIG. 6, it is contemplated that the perforated plate 114 be compressed such that the perforated plate has the compressed major dimension 162. Once compressed, the perforated plate 114 is inserted into the interior 124 (shown in FIG. 3) of the canister 106, translated along the canister axis 108 through the interior 124 of the canister 106 and along the canister axis 108, axially registered with the plenum portion 128 (shown in FIG. 1) of the canister 106. Once registered, the perforated plate 114 is partially relaxed to assume the snap-fit major dimension 164 to snap into the plenum portion 128 of the canister 106. The snap-fit major dimension 164 is defined by engagement of the first flange portion 140 and the second flange portion 142 with an interior surface 168 (shown in FIG. 3) of the plenum portion 128 of the canister 106, the perforated plate 114 thereby radially abutting a portion of the separator 102 radially spanning the plenum portion 128 of the canister 106.

As will be appreciated by those of skill in the art in view of the present disclosure, the snap-fit major dimension 164 allows the canister 106 and the perforated plate 114 to structurally support to the separator 102 along the separator axial length without the need to form perforations directly in the wall of the canister 106. As will also be appreciated by those of skill in the art in view of the present disclosure, eliminating operations necessary to form a perforation pattern within the wall of the canister 106 simplifies the manufacture of the air separation module 100 as perforations can be stamped relatively easily into the perforated plate 114 prior imparting an arcuate shape to the perforated plate 114.

In certain examples the snap-fit major dimension 164 is substantially equivalent to the canister diameter 166 (shown in FIG. 3). In such examples the canister 106 and the perforated plate 114 cooperatively provide continuous support along the length of the portion of the separator 102 axially spanning the perforated plate 114, allowing the air separation module 100 to employ separators having relatively fragile rolled fiber mat structures.

Figure 7:
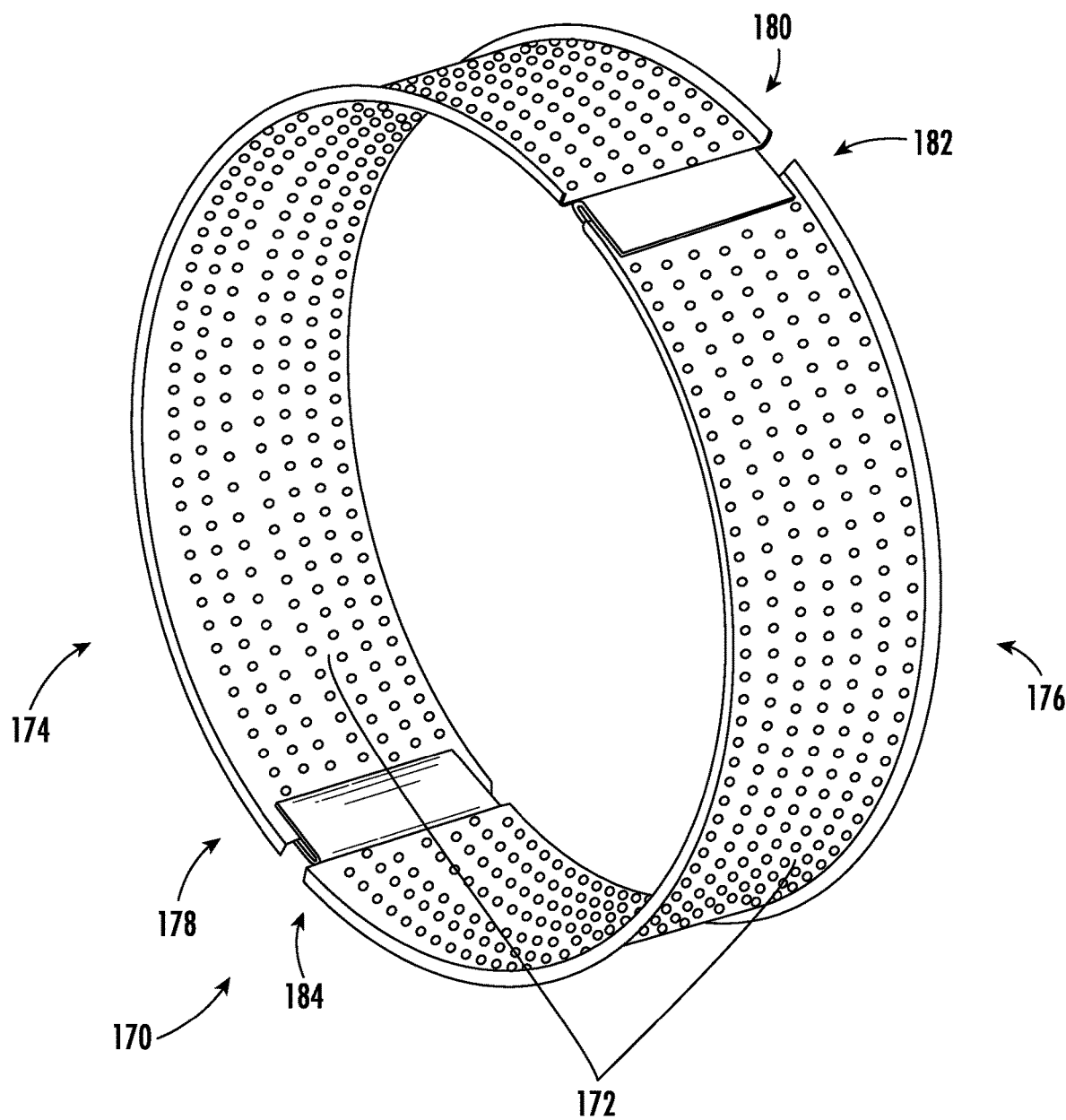
FIG. 7 is a perspective view of a perforated plate of the air separation module of FIG. 1 according to a second example, showing a segmented annulus having a first annular segment and a second annular segment coupled by plate ends and clip ends of the annular segments.
Figure 8:
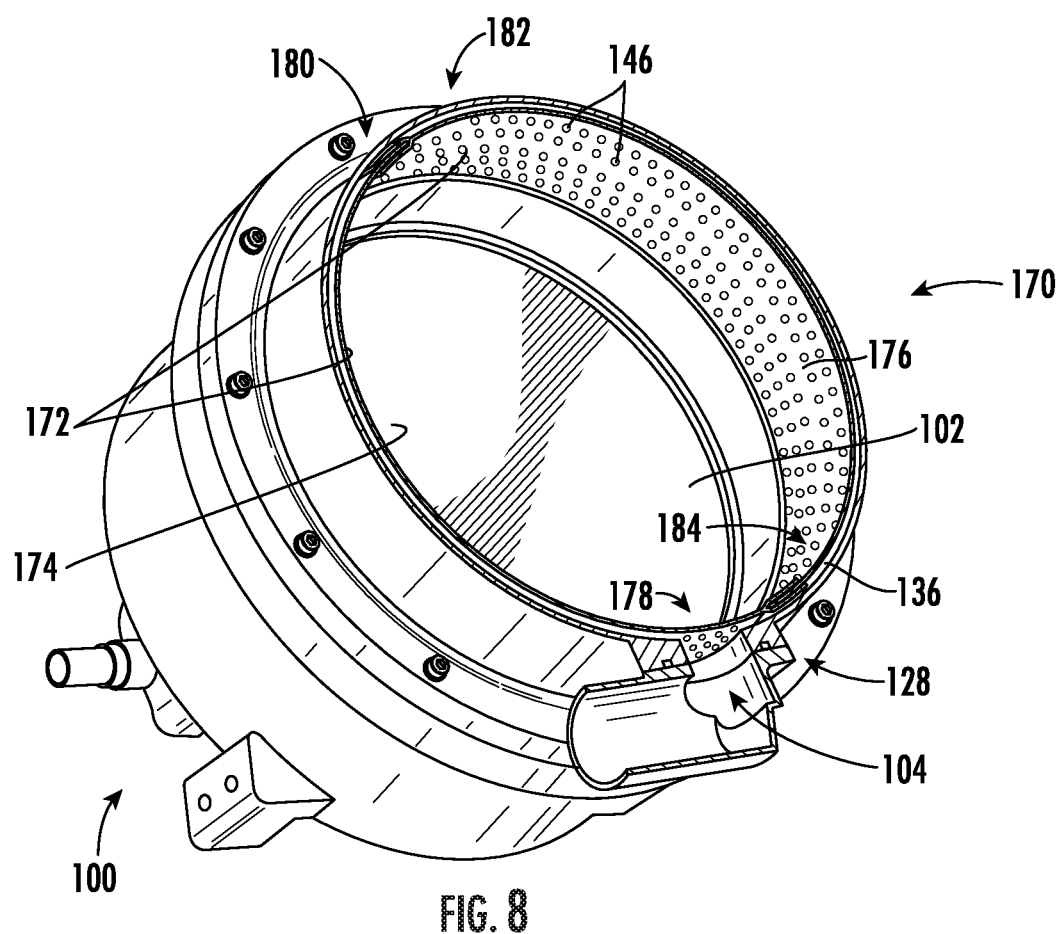
FIG. 8 is a cross-sectional view of a portion of air separation module of FIG. 1 including a portion of the perforated plate according to the second example, showing perforated plate snap-fit into the interior of the canister and fluidly coupling an interior of the canister to the oxygen-enriched air output port.

With reference to FIGS. 7 and 8, a perforated plate 170 is shown according to a second example. The perforated plate 170 is similar to the perforated plate 114 (shown in FIG. 4) and additionally includes a segmented annulus body 172 each having a plurality of perforations 146. The segmented annulus body 172 includes a first annular segment 174 and a second annular segment 176. The first annular segment 174 has a first plate end 178 and a circumferentially opposite first clip end 180, the second annular segment 176 has a second plate end 182 and a second clip end 184. The first plate end 178 of the first annular segment 174 is slidably received in the second clip end 184 of the second annular segment 176 and the second plate end 182 of the second annular segment 176 is slidably received within the first clip end 180 of the first annular segment 174. It is contemplated that the first annular segment 174 and the second annular segment 176 cooperate to circumferentially span the plenum portion 128 (shown in FIG. 3) of the canister 106 (shown in FIG. 1).

As will be appreciated by those of skill in the art in view of the present disclosure, the perforated plate 170 is similarly adjustable to have the relaxed major dimension 160 (shown in FIG. 6), the compressed major dimension 162 (shown in FIG. 6), and the snap-fit major dimension 164 (shown in FIG. 6). Specifically, each of the first annular segment 174 and the second annular segment 176 have circumferential spans that, when assembled to another and partially relaxed within the canister 106 (shown in FIG. 1), define a snap-fit major dimension is substantially equivalent to the canister diameter 166 (shown in FIG. 3). As will also be appreciated by those of skill in the art in view of the present disclosure, the perforated plate 170 more closely conforms to a geometric circle when compressed due to the segmented construction of the segmented annulus body 172, the perforated plate 170 thereby providing relatively uniform support to the separator 102 (shown in FIG. 1) about the circumference of the separator 102.

Figure 9:
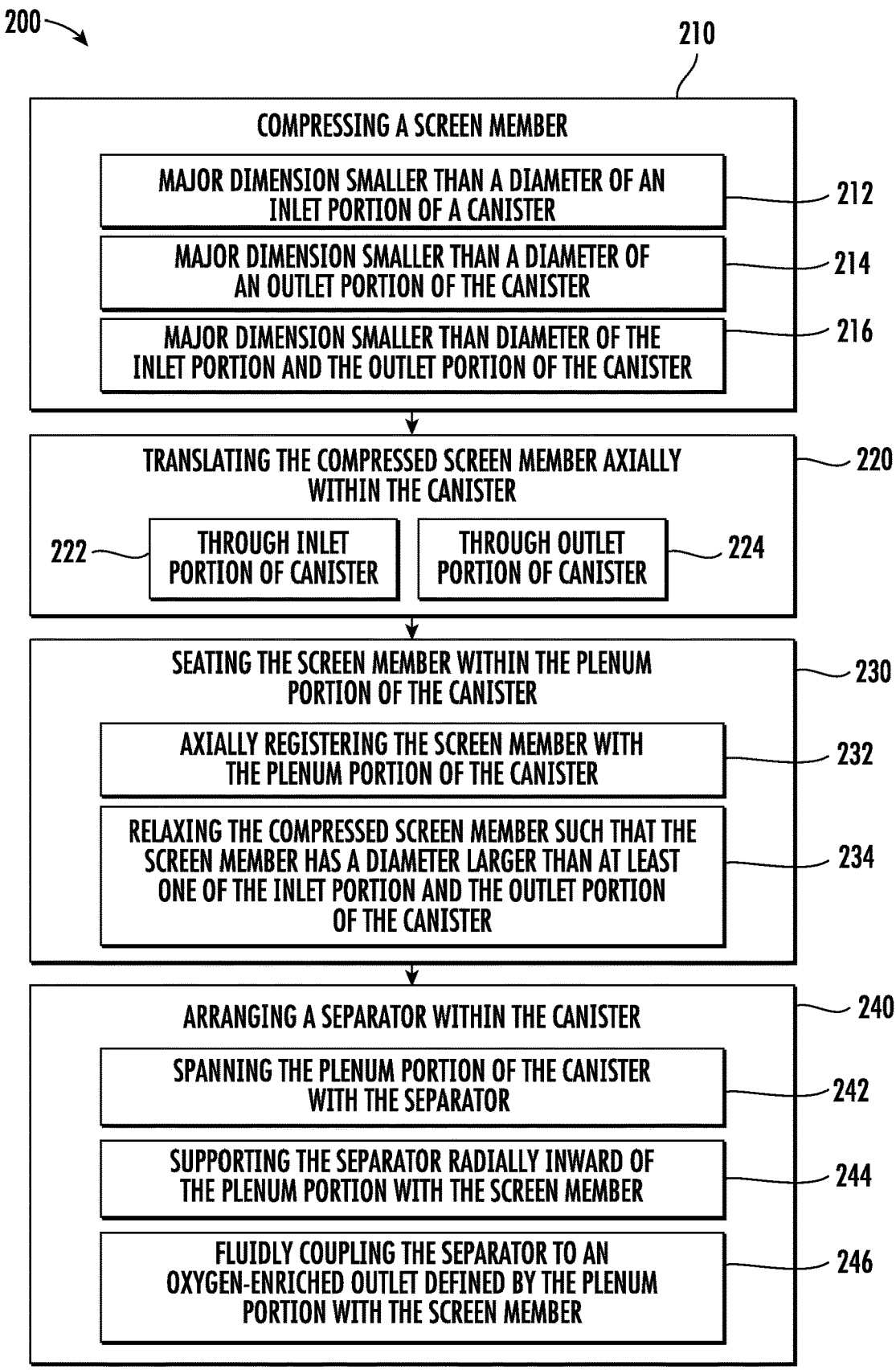
FIG. 9 is a block diagram of a method of making an air separation module, showing operations of the method according to an illustrative and non-limiting example of the method.

With reference to FIG. 9, a method 200 of making an air separation module, e.g., the air separation module 100 (shown in FIG. 1), is shown. The method 200 includes compressing a perforated plate, e.g., the perforated plate 114 (shown in FIG. 1), as shown with box 210. The method 200 also includes inserting the compressed perforated plate in a canister, e.g., the canister 106 (shown in FIG. 2), and translating the compressed perforated plate axially within the canister, as shown with box 220. The method 200 additionally includes seating the perforated plate within a plenum portion of the canister, e.g., the plenum portion 128 (shown in FIG. 2), as shown with box 230. The method 200 further includes arranging a separator, e.g., the separator 102 (shown in FIG. 3), as shown with box 240.

As shown with box 212, compressing the perforated plate can include compressing the perforated plate to have a compressed major dimension, e.g., the compressed major dimension 162 (shown in FIG. 6) that is smaller than diameter of the inlet portion of the canister, e.g., the canister diameter 166 (shown in FIG. 3). In certain examples compressing the perforated plate can include compressing the perforated plate such that the major dimension of the perforated plate is smaller than diameter of the inlet portion of the canister, as shown with box 214. It is also contemplated that, in accordance with certain examples, that compressing the perforated plate include compressing the perforated plate such that the major dimension of the perforated plate is smaller than both the diameter of the inlet portion and the outlet portion of the canister, as shown with box 216.

As shown with box 222, translating the perforated plate axially through the canister can include translating the perforated plate axially through the inlet portion of the canister. It is also contemplated that translating the perforated plate axially through the canister include translating the perforated plate axially through the outlet portion of the canister, as shown with box 224.

As shown with box 232, seating the perforated plate within the plenum portion of the canister can include axially registering the perforated plate with the plenum portion of the canister. It is also contemplated that seating the perforated plate within the plenum portion of the canister can include relaxing the compressed perforated plate such that the major dimension of the perforated plate, e.g., a diameter of the perforated plate, is larger than at least one of the diameter of the inlet portion and the outlet portion of the canister, as shown with box 234. Relaxing the perforated plate can include snap-fitting the perforated plate within the plenum portion of the canister, e.g., fixing the perforated plate in rotation relative to the canister within the plenum portion of the canister with residual compressive load carried by the perforated plate, as also shown be box 234.

As shown with box 242, arranging the separator within the canister can include spanning the plenum portion of the canister with the separator. Arranging the separator within the canister can include supporting the separation radially inward of the plenum portion of the canister with the perforated plate, as shown with box 244. It is also contemplated that arranging the separator within the canister include fluidly coupling the separator to an OEA air outlet defined by the plenum portion of the canister, e.g., to the OEA outlet port 104 (shown in FIG. 1), as shown by box 246.

The terminology used herein is for the purpose of describing particular embodiments only and is not intended to be limiting of the present disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, element components, and/or groups thereof.

While the present disclosure has been described with reference to an exemplary embodiment or embodiments, it will be understood by those skilled in the art that various changes may be made and equivalents may be substituted for elements thereof without departing from the scope of the present disclosure. In addition, many modifications may be made to adapt a particular situation or material to the teachings of the present disclosure without departing from the essential scope thereof. Therefore, it is intended that the present disclosure not be limited to the particular embodiment disclosed as the best mode contemplated for carrying out this present disclosure, but that the present disclosure will include all embodiments falling within the scope of the claims.

What is claimed is:

1. An air separation module, comprising:
   a canister with a plenum portion connecting an inlet portion to an outlet portion and extending circumferentially about a canister axis, the plenum portion having a plenum diameter that is larger than a canister diameter defined by the inlet portion and the outlet portion of the canister;
   a separator arranged within the canister and axially spanning the plenum portion of the canister, the separator configured to separate air received at the inlet end portion into a nitrogen-enriched air flow and an oxygen-enriched air flow; and
   a perforated plate seated within the plenum portion and fluidly coupling the separator to an oxygen-enriched air outlet port defined by the plenum portion, wherein the perforated plate has a snap-fit major dimension that is smaller than the plenum diameter to radially support a portion of the separator axially spanning the plenum portion of the canister;
   wherein the perforated plate has a split annulus body with a plate end and a clip end, the plate end slidably disposed within the clip end of the split annulus body.

2. The air separation module of claim 1, wherein the perforated plate has a perforated portion with a plurality of perforations extending therethrough.

3. The air separation module of claim 2, wherein the perforated plate has a flange portion extending radially outward from the perforated portion of the perforated plate.

4. The air separation module of claim 3, wherein the flange portion is a first flange portion and the perforated plate has a second flange portion, wherein the perforated portion connects the first flange portion to the second flange portion.

5. The air separation module of claim 3, wherein the perforated portion of the perforated plate is radially spaced from an interior surface of the plenum portion by the flange portion of the perforated plate, the interior surface and the perforated portion defining a plenum therebetween.

6. The air separation module of claim 1, wherein the perforated plate extends circumferentially about the separator and abuts a radially outer surface of the separator.

7. The air separation module of claim 1, wherein the plate end of the split annulus body has a plate member extending circumferentially therefrom.

8. The air separation module of claim 1, wherein the clip end of the split annulus body has a radially inner clip member and a radially outer clip member extending circumferentially from the clip end of the split annulus body.

9. The air separation module of claim 1, wherein the inlet portion of the canister is arranged radially inward of the plenum portion of the canister, wherein the outlet portion of the canister is arranged radially inward of the plenum portion of the canister.

10. The air separation module of claim 1, further comprising:

an inlet end cap fixed to the inlet portion of the canister; and an outlet end cap fixed to the outlet portion of the canister, wherein the separator is enclosed within the inlet end cap, the outlet end cap, and the canister.

11. The air separation module of claim 1, wherein the snap-fit major dimension of the perforated plate is substantially equivalent to the canister diameter.

12. The air separation module of claim 1, wherein the perforated plate and the plenum portion define a plenum therebetween, the plenum extending circumferentially about the perforated plate, wherein the perforated plate has a compressed major dimension and a relaxed major dimension, the relaxed major dimension larger than the snap-fit major dimension, the compressed major dimension smaller than the snap-fit major dimension.

13. A nitrogen generation system, comprising:
an air separation module as recited in claim 1, wherein the perforated plate has a perforated portion with a plurality of perforations extending therethrough;
an ozone converter fluidly coupled to the separator;
an oxygen sensor fluidly coupled to the ozone converter by separator; and
a flow control valve fluidly coupled to the ozone converter by the separator.

14. The nitrogen generation system of claim 13, wherein the perforated plate extends circumferentially about the separator, wherein the perforated plate abuts a radially outer surface of the separator, the nitrogen generation system further comprising:
a compressed air source fluidly coupled to the air separation module; and
a fuel tank fluidly coupled to the compressed air source by the air separation module.

15. The nitrogen generation system of claim 13, wherein the plate end is adjacent the clip end when the perforated plate is compressed, and wherein the plate end is spaced apart from the clip end when the perforated plate is relaxed.

16. An air separation module, comprising:
a canister with a plenum portion connecting an inlet portion to an outlet portion and extending circumferentially about a canister axis, the plenum portion having a plenum diameter that is larger than a canister diameter defined by the inlet portion and the outlet portion of the canister;
a separator arranged within the canister and axially spanning the plenum portion of the canister, the separator configured to separate air received at the inlet end portion into a nitrogen-enriched air flow and an oxygen-enriched air flow; and
a perforated plate seated within the plenum portion and fluidly coupling the separator to an oxygen-enriched air outlet port defined by the plenum portion, wherein the perforated plate has a snap-fit major dimension that is smaller than the plenum diameter to radially support a portion of the separator axially spanning the plenum portion of the canister;
wherein the perforated plate comprises:
a first annular segment with a plate end; and
a second annular segment with a clip end,
wherein the plate end of the first annular segment is slidably received within the clip end of the second annular segment.

17. The air separation module of claim 16, wherein the first annular segment has a clip end, wherein the second annular segment has a plate end, and wherein the plate end of the second annular segment is slidably received within the clip end of the first annular segment.

18. The air separation module of claim 16, wherein the first annular segment and the second annular segment cooperate to circumferentially span the plenum portion of the canister.

19. A nitrogen generation system, comprising:
an air separation module as recited in claim 16, wherein the perforated plate has a perforated portion with a plurality of perforations extending therethrough;
an ozone converter fluidly coupled to the separator;
an oxygen sensor fluidly coupled to the ozone converter by separator; and
a flow control valve fluidly coupled to the ozone converter by the separator.

20. A method of making an air separation module, comprising:
at a canister with a plenum portion connecting an inlet portion to an outlet portion and extending circumferentially about a canister axis, the plenum portion having a plenum diameter larger than a canister diameter defined by the inlet portion and the outlet portion of the canister,
compressing a perforated plate such that the perforated plate has a compressed major dimension smaller than the canister diameter;
seating the perforated plate within the plenum portion of the canister by relaxing the compressed perforated plate, the perforated plate having a snap-fit major dimension that is smaller than the plenum diameter once relaxed; and
arranging a separator configured to separate air received at the inlet end portion into a nitrogen-enriched air flow and an oxygen-enriched air flow within the canister, the separator spanning the plenum portion and supported radially inward of the plenum portion by the perforated plate.

* * * * *